United States Patent [19]

Frank

[11] 3,992,182
[45] Nov. 16, 1976

[54] CONVEYING SHEETS AT NON-UNIFORM SPEED

[75] Inventor: Robert G. Frank, Murrysville, Pa.
[73] Assignee: PPG Industries, Inc., Pittsburgh, Pa.
[22] Filed: Sept. 18, 1974
[21] Appl. No.: 507,033

[52] U.S. Cl. .................................. 65/163; 65/254; 198/461; 198/579
[51] Int. Cl.² ..................................... C03B 35/00
[58] Field of Search ................... 198/29, 30, 34, 76, 198/127 R, 282, 283, 284, 286; 65/253, 163, 254; 74/661, 722

[56] References Cited
UNITED STATES PATENTS

| | | | |
|---|---|---|---|
| 3,254,778 | 6/1966 | Marland et al. | 198/127 R |
| 3,315,860 | 4/1967 | Adams et al. | 74/661 |
| 3,338,493 | 8/1967 | Schiffer | 74/722 |
| 3,404,658 | 10/1968 | French et al. | 198/76 |
| 3,701,643 | 10/1972 | Frank | 65/253 |
| 3,706,370 | 12/1972 | Bonafino et al. | 198/76 |

Primary Examiner—Evon C. Blunk
Assistant Examiner—Joseph E. Valenza
Attorney, Agent, or Firm—Edward I. Mates

[57] ABSTRACT

A system for conveying a series of glass sheets at a non-uniform speed through sheet treatment apparatus comprising a plurality of treatment stations. Longitudinally spaced conveyor rolls are rotated at a first speed at a first sheet treatment station where each sheet in turn is oriented and aligned properly relative to said conveying system and other rolls are rotated at a greater speed at a second sheet treatment station where the properly oriented and aligned sheet is treated. A plurality of clutch means selectively and simultaneously engage different subseries of a selected series of the conveyor rolls to rotate the selected series of rolls at said greater speed to transfer each sheet in succession to the second treatment station as rapidly as possible and then disengage each clutch means according to a predetermined time cycle that can be adjusted to accommodate for transferring glass sheets of different lengths to cause the rolls of each different subseries of the selected series of rolls in sequence to resume the first speed whenever the trailing edge of said glass sheet passes beyond its controlled subseries of rolls. This system reduces the overall length of the conveyor needed to move the series of glass sheets through several treatment stations and provides minimum marking on the glass sheet surfaces supported by the conveyor rolls by minimizing the proportion of glass sheet simultaneously engaged by rolls rotating at different rotational speeds. This system also minimizes the tendency of the sheets to become cocked or misaligned if they are not rectangular in outline.

6 Claims, 5 Drawing Figures

CONVEYING SHEETS AT NON-UNIFORM SPEED

BACKGROUND OF THE INVENTION

1. Field of the Invention

This invention relates to conveyors and more particularly, to conveyors for moving a succession of articles such as glass sheets through a treatment apparatus at multiple speeds. The invention has particular but not exclusive utility in the conveyance of glass sheets through a heat-treating apparatus.

When glass sheets are conveyed through a heat-treating apparatus, it is frequently desirable to impart different velocities successively to each glass sheet as the latter passes through successive treatment stations or transfers from one treatment station to another along the length of the apparatus. In a mass production operation, articles are frequently moved at a non-uniform velocity so that each article in turn moves at a different speed through one or more selected treatment stations or transfers between treatment stations than it does throughout the general length of the apparatus. In treating glass sheets, it is especially advantageous to be able to move them relatively slowly during their passage through certain treatment stations and more rapidly between other treatment stations.

In apparatus containing a roller-type conveyor for heat-strengthening or tempering glass sheets or for shaping glass sheets by roll forming followed by rapid cooling, it is customary to move a series of glass sheets at a relatively slow speed through a heating furnace and then move each sheet more rapidly through the roll forming station and cooling station. Unless the rolls which convey each glass sheet change speed according to a desired cycle, each glass sheet may be engaged simultaneously by conveyor rolls rotating at different speeds. Such simultaneous engagement causes roll marking and may cause sheet misalignment.

2. Description of the Prior Art

It is well known to use a roller type of conveyor in which articles to be conveyed are engaged directly by rotating rolls which drive the glass sheet by frictional engagement with their bottom surfaces. Successive conveyor rolls or sets of rolls may be rotated at different speeds as required to vary the velocity imparted to the glass sheet. However, when different portions of a glass sheet are simultaneously engaged by two different conveyor rolls rotating at different speeds, and the temperature of the glass is sufficiently high, the bottom surface of the glass becomes marked if the rotating velocity of different conveyor rolls engaging a glass sheet simultaneously differs significantly. Also, if the glass sheet is not of rectangular outline and/or its longitudinal axis through its center of gravity is not parallel to the path of the conveyor, the glass sheet tends to skew when it is simultaneously engaged by conveyor rolls rotating at different speeds.

U.S. Pat. No. 1,638,769 to Hitchcock discloses a system of conveyor rolls arranged so that a glass batch formed by casting and rolling is transferred to an annealing lehr at an initial high speed and then passed through the annealing lehr at a considerably lower speed so as to reduce the length needed for the annealing lehr. The arrangement in the Hitchcock apparatus is such that the glass passes from a high speed entry section of the lehr to a lower speed main section in such a manner that the glass is always supported by a set of rolls, all of which rotate simultaneously at the same peripheral speed. This uniformity in peripheral speed, first at a high speed and then at a lower speed, avoids the tendency to buckle the sheet which might occur if the sheet were engaged at its forward end by rolls rotating at a relatively slow speed while its trailing end is still being supported by rolls rotating at a relatively high speed. In the Hitchcock patent, the conveyor rolls are so arranged and timed that the forward end of a newly formed sheet conveyed downstream by rotation of the conveyor rolls at high speed approaches closely to the rear end of the preceding sheet which has been transferred to conveyor rolls rotating at a low speed before the rate of the high speed rolls is reduced to allow the use of the annealing lehr to its full capacity.

Another patent which discloses roller conveyors for treating glass sheets wherein one set of rolls is moved at a higher speed than the remaining rolls in the conveyor is U.S. Pat. No. 2,848,845 to Doumont. This patent provides high speed rolls at the exit of an annealing lehr to separate a broken section of a continuous glass ribbon from the remainder of the ribbon whenever the glass ribbon breaks during annealing. Separating avoids further glass breakage resulting from repeated collison of the leading edge of the newly formed continuous ribbon against the trailing edge of the broken ribbon portion.

Other patents that provide multiple speed roller conveyor systems for conveying glass sheets through a succession of glass treatment stations include Canadian Pat. No. 680,042 to Carson and the following U.S. Pat. Nos.: Ritter U.S. Pat. No. 3,338,695; Rahrig, O'Connell and Ferguson U.S. Pat. No. 3,372,016; Carson, Ferguson, Ritter and Hymore U.S. Pat. No. 3,396,000; Carson and Ritter U.S. Pat. No. 3,522,029 and Ritter U.S. Pat. No. 3,672,861.

Another patent that conveys glass sheets at a non-uniform velocity through a heat-treatment apparatus is U.S. Pat. No. 3,594,149 to Pickavance and Freestone. However, in this patent the glass sheets are continuously engaged along their edges by fingers which are caused to move at different speeds when moving the glass through or between different stations of the glass treatment apparatus. This latter patent does not move the glass sheet from roll to roll to provide sequential contact of different glass sheet portions as in a roller conveyor. Therefore, the glass edge engaging fingers are likely to distort the continuously engaged glass sheet edge portions.

Despite the patents enumerated, there still remains a need in the glass treatment art for heat-treatment apparatus provided with conveyors capable of ready adjustment of the rotational speed of rotating conveyor rolls that is also capable of rapid adjustment of conveyor speed to enable the conveyor to be adjusted rapidly to accommodate for conveying sheets of different lengths through a conveyor of minimum length and, at the same time, accomplish the objectives of first orienting and aligning the glass sheets properly relative to said conveyor and then avoiding roll marking and skewing of the glass sheets moved along said conveyor during a multiple step treatment at multiple speeds.

SUMMARY OF THE INVENTION

The present invention provides apparatus for moving a succession of discrete glass sheets at a non-uniform speed during heat-treatment thereof comprising first and second series of longitudinally spaced conveyor rolls, means for rotating the first series of rolls at a first speed and the second series at a second speed faster than said first speed, a selected series of conveyor rolls comprising a plurality of subseries of said selected series of rolls bridging the gap between said first series and said second series, a plurality of clutch means, each coupled to a different subseries of said selected series of said conveyor rolls to rotate said selected series of conveyor rolls at said second speed when engaged with its associated subseries and permitting said subseries of said conveyor rolls to rotate at said first speed when disengaged from said associated subseries, timing means for selectively actuating each of said plurality of clutch means in unison and for deactivating each of said plurality of clutch means in succession according to a predetermined time cycle, and glass detector means responsive to the presence of each glass sheet in said series at a predetermined position to actuate said timing means, whereby said plurality of clutch means engage said associated subseries simultaneously when each glass sheet in succession occupies a preselected position over said selected series of said conveyor rolls and each of said clutch means is disengaged from its associated subseries in succession when the trailing edge of each glass sheet passes beyond said associated subseries.

The apparatus further comprises means movable in a reciprocating motion including a forward component of motion at said first speed for aligning each glass sheet in succession as it passes a portion of the conveyor driven at said first speed and may be incorporated in any type of glass treatment apparatus, an example of which is so-called roll forming apparatus of the type depicted in U.S. Pat. No. 3,701,644 to Robert G. Frank, the detailed description of said patented apparatus being incorporated herein by reference.

An illustrative preferred embodiment of the present invention will be described to facilitate an understanding of the present invention.

BRIEF DESCRIPTION OF THE DRAWINGS

In the drawings which form part of the description of the illustrative embodiment and wherein like reference numbers refer to like structural elements.

DESCRIPTION OF A PREFERRED EMBODIMENT

Figure 1:
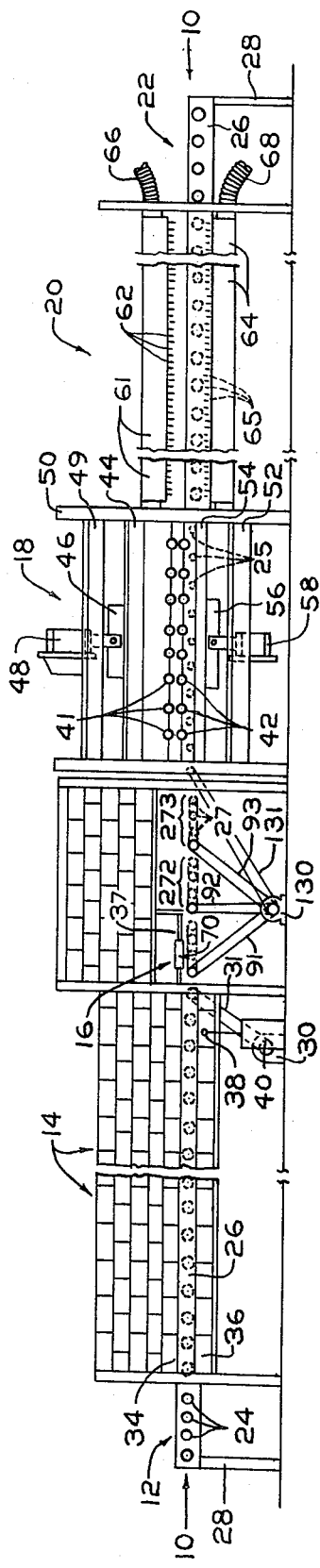
FIG. 1 is a longitudinal elevational view of roll forming apparatus for shaping glass sheets on a mass production basis incorporating a preferred embodiment of the present invention.
Figure 2:
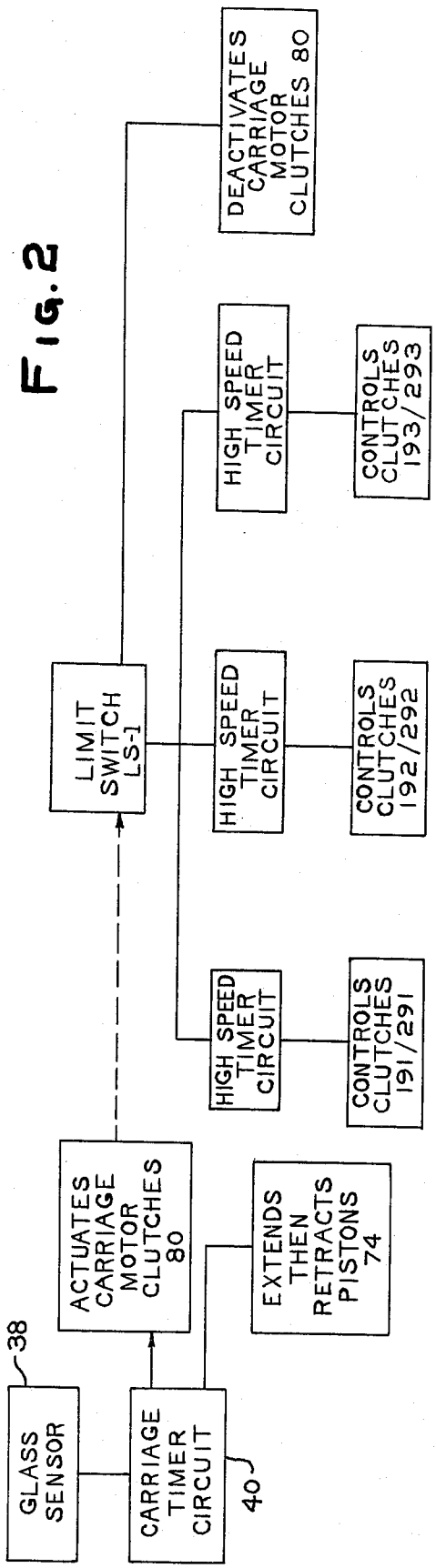
FIG. 2 is a block diagram showing the various steps of a typical operation according to the present invention.

The apparatus of the present invention comprises a horizontally extending conveyor 10 extending through several treatment stations. The latter include a glass loading station 12, a tunnel-type furnace 14, which includes an alignment and orientation station 16 near the exit end of the furnace, a sheet forming station 18, a chilling station 20 and an unloading station 22.

The conveyor 10 comprises a first series of longitudinally spaced horizontally extending conveyor rolls 24 arranged to form a horizontal path of travel through the first portion of the apparatus, a second series of conveyor rolls 25 forming a horizontal path of travel through the final portion of the apparatus and a selected series of conveyor rolls 27 arranged in subseries 271, 272 and 273 bridging the gap between the first series and the second series. Each roll 24, 25 and 27 is supported by a roll support housing (not shown) at each longitudinal end portion thereof. Horizontal, longitudinally extending supports 26 are provided for each set of roll support housings. Vertical pillars 28 are provided along the length of the conveyor 10 to support the horizontal supports 26 at a desired elevation above the floor of the factory.

The conveyor comprises a first series of rolls run continuously at a first conveyor speed through the furnace from a first speed drive motor 30 which is connected through a driving chain system 31 and sprockets 32 carried at one end of each of the conveyor rolls 24 in the loading station 12 and throughout most of the length of furnace 14. The second series of rolls 25 are located in the stations 18, 20 and 22 and are driven at a second speed greater than the first speed from a high speed motor 130 through a second chain system 131. The rolls 27 are selectively coupled to either the first speed drive motor 30 or the high speed motor 130. The novel program of coupling the subseries 271, 272 and 273 to the different motors is an important characteristic of the present invention that makes it possible to transport sheets of considerably different lengths from the first series of conveyor rolls 24 to the second series of conveyor rolls 25 with minimum time needed to disrupt the continuous operation of the glass treatment apparatus. This flexibility of operation with glass sheets of different lengths is a benefit of the present invention not readily available from the prior art, to the best of the inventor's knowledge.

The conveyor rolls are disposed horizontally in a commom horizontal plane. The uppermost portion of the roll peripheries provide a tangential plane coextensive with a support plane along which a series of glass sheets is conveyed along the conveyor path extending from the glass loading station 12 through the various treatment stations in succession and into the unloading station 22.

The furnace 14 has conventional heating elements 34 and 36 disposed respectively above and below the plane occupied by the conveyor rolls 24. Thus, the glass sheets are heated as they are conveyed through the furnace 14 by the longitudinally spaced conveyor rolls 24.

The side walls of the furnace 14 are provided with aligned parallel longitudinally extending slots 37 on both sides of the alignment and orientation station 16 near the exit end of the furnace slightly beyond a glass sensing mechanism 38. Another glass sensing mechanism 39 is located before the entrance to the sheet forming station 18. The mechanism 38 actuates a carriage timer circuit 40, whose operation will be described later, while mechanism 39 actuates a timer circuit (not shown) that controls the cycle of operation of the moving elements of the sheet forming station 18 in accordance to the desires of the operators.

The sheet forming station 18 includes a pair of sets of shaped, segmented forming rolls 41 and 42 of complementary contour. Each upper forming roll 41 is aligned with a corresponding lower forming roll 42. The upper forming rolls are rotatably supported from their ends by vertically adjustable trunnions in an open frame structure 44 depending from an upper platform 46 which is attached to the lower end of a rod of an upper piston 48. The latter is supported on an upper horizontal support structure 49 of a skeleton support structure 50.

The structure 50 also includes a lower horizontal support structure 52. The lower forming rolls 42 are rotatably supported on vertically adjustable trunnions in a lower open frame 54 connected to and supported by a lower platform 56. The latter is attached to the upper end of a rod of a lower piston 58 supported by the lower horizontal support structure 52.

The forming rolls 41 and 42 are each composed of a plurality of segments, at least one segment of each forming roll being attached to a rotating rod to insure that at least one segment of each forming roll is positively driven. The upper and lower sets of forming rolls 41 and 42 are arranged in pairs in vertical planes between certain adjacent conveyor rolls 25 located at the sheet forming station 18.

The lower piston 58 is actuated to move the lower set of forming rolls 42 upward to lift a heat-softened glass sheet off the conveyor rolls 25 and into rolling contact against the upper set of forming rolls 41 for a brief interval sufficient to impose the curvature of the segmented forming rolls onto the heat-softened glass sheet before the lower forming rolls 42 retract to redeposit the shaped glass sheet on the conveyor rolls 25.

Further details of the roll forming apparatus may be obtained from U.S. Pat. No. 3,701,644 of Robert G. Frank.

The cooling station 20 comprises an upper plenum chamber 61 having downwardly extending nozzles 62 whose exit openings extend horizontally in a transverse direction and which open downwardly from above the path of sheet travel in longitudinally spaced relation intermediate adjacent conveyor rolls 25 throughout the cooling station 20. The latter also includes a lower plenum chamber 64 having upwardly facing nozzles 65 extending upward toward the spaces between and terminating below the conveyor rolls 25 of the cooling station 20. Each nozzle 65 faces a corresponding nozzle 62. Means are provided for delivering air under pressure through delivery passages 66 and 68 to the respective plenum chambers 61 and 64. In this way, cool air blasts are imparted to the upper and lower surfaces of the roll formed glass sheets that are conveyed through the cooling station 20.

In order to provide a complete disclosure of apparatus in which the present invention has been found most suitable, a description is also provided for the alignment and orienting station 16. It is understood, however, that a more complete description of the alignment and orienting station may be obtained from U.S. Pat. No. 3,701,643 to Robert G. Frank, the disclosure of which is incorporated herein by reference.

It is important that glass sheets be properly aligned and oriented with respect to the sheet forming station, particularly when they are to be shaped to complex curvatures. The alignment and orienting station 16, which forms part of the illustrative embodiment of the present invention comprises a pair of orienting and aligning carriages 70. Each carriage is mounted for reciprocation along a track 72 which extends longitudinally on either side of the exit end of the furnace 14 laterally outside the elongated slots 37. A carriage is provided on each side of the furnace 14.

Each carriage 70 supports a pair of glass engaging members 73 whose positions transverse to the path of glass movement is controlled by alignment pistons 74. Each piston 74 contains a narrow elongated piston rod 75 which extends transversly of the conveyor 10 through an elongated slot 37 in one or the other side wall of the furnace 14. The glass engaging members 73 are in the form of flat narrow discs, at least two of which make peripheral contact with each side edge of the glass sheet that is at the station 16.

Each track 72 extends between a rear abutment 76 upstream of the slots 37 and a forward abutment 77 downstream of the slots 37 to limit the length of displacement of each carriage 70. A carriage drive chain 78 is connected to the forward end of each carriage 70. The latter is pulled downstream in response to actuation of a carriage drive motor 79 through a carriage drive clutch 80. A pair of clutches 80 and a pair of drive chains 78 are mounted on a common motor drive shaft 81 rotated by the carriage drive motor 79 to insure that the carriages 70 move downstream simultaneously and in unison.

Each carriage 70 is biased to return to the rear abutment 76 by a spring attachment 82 that interconnects the rear end of each carriage 70 with the rear abutment 76. Normally the carriage drive motor 79 is actuated in response to actuation by the carriage timer circuit 40 a predetermined time interval after the glass sensing mechanism 38 has detected the presence of a glass sheet thereabove. A limit switch LS-1 is provided at the alignment and orienting station 16 for actuation by an abutment on one of the carriages 70 to deactivate the carriage drive clutches 80 until such time as a succeeding glass sheet causes the cycle to repeat by arriving over the glass sensing mechanism 38 in the furnace.

According to one embodiment of the present invention, the illustrative embodiment is modified to selectively engage the high speed drive motor 130 to a first drive chain 91, a second drive chain 92 and a third drive chain 93 respective clutches 191, 192 and 193. Drive chain 91 operates subseries 271 at the second speed when its associated clutch 191 is engaged. Similarly, drive chain 92 operates subseries 272 and drive chain 93 operates subseries 273 at said second speed when their associated clutches 192 and 193 are respectively engaged. Additional companion clutches 291, 292 and 293 are provided for use with the same conveyor rolls whose rotational speed is controlled by the clutches 191, 192 and 193.

Each clutch 191, 192 and 193 operates in unison with its companion clutch 291, 292 and 293 respectively, in such a manner that when clutch 191 is engaged, clutch 291 is disengaged, and vice versa. Similarly, clutches 192 and 292 are operated as a pair and so are clutches 193 and 293. However, each pair of companion clutches can be operated independently of the other two pairs.

OPERATION

Figure 3A:
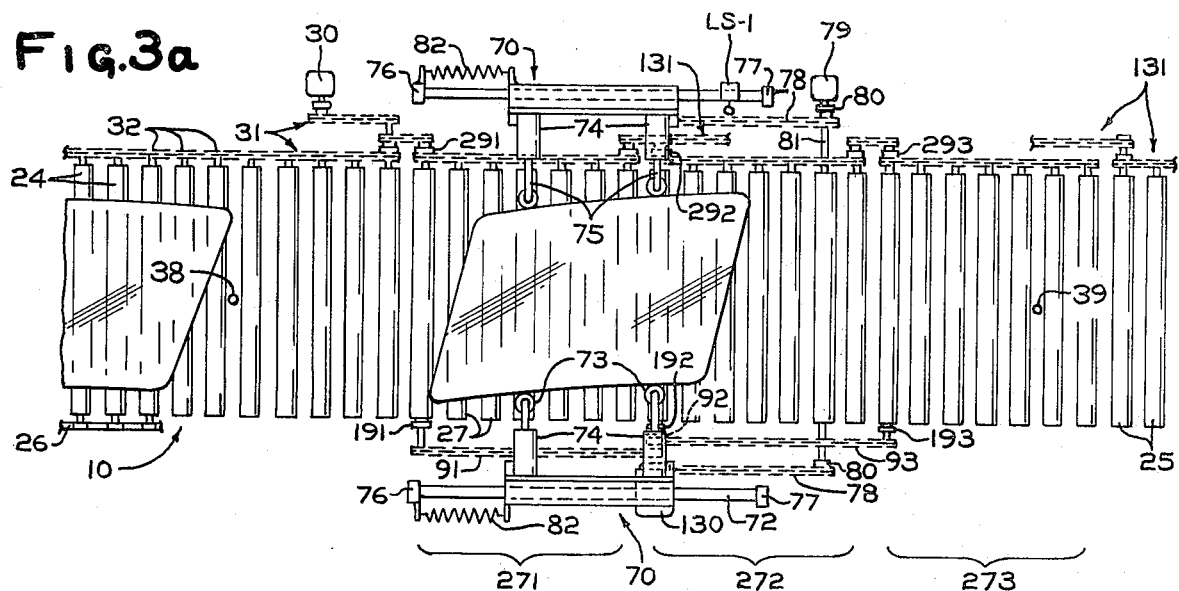
FIG. 3a is a plan view showing the alignment device engaging a glass sheet while the glass sheet is moving at the low speed.

The present invention operates in response to the detection of a leading edge of a glass sheet passing over the glass sensing mechanism 38 toward the alignment and orientation station 16 near the exit of the furnace 14. In FIG. 3A, a first glass sheet is shown moving along the portion of the horizontally extending conveyor 10 traversing the alignment and orienting station 16. In fact, the alignment pistons 74 have already moved inward to enable the glass engaging members 73 to engage the opposite side edges of the glass sheet so that the glass is properly oriented and aligned in preparation for its entry into the sheet forming station 18.

The carriages 70 are moved downstream in unison from carriage drive motor 79 through the common motor drive shaft 81 and each carriage drive chain 78 at the same speed as the first conveyor speed until such time as the abutment on one of the carriages 70 makes contact with limit switch LS-1. This deactivates the carriage drive clutches 80 and enables the spring connections 82 to retract the carriages 70 toward the rear abutments 76. The carriage timer circuit 40 has extended the pistons 74 inward for distances sufficient to engage the opposite glass sheet edges and then retracted the pistons so that the pistons are in a retracted position as the carriages 70 move upstream to the rear abutments 76. At the same time, a subsequent glass sheet in the series has its leading edge approaching the glass sensing mechanism 38, where, upon its arrival thereover, it will actuate the carriage timer circuit 40.

Figure 3B:
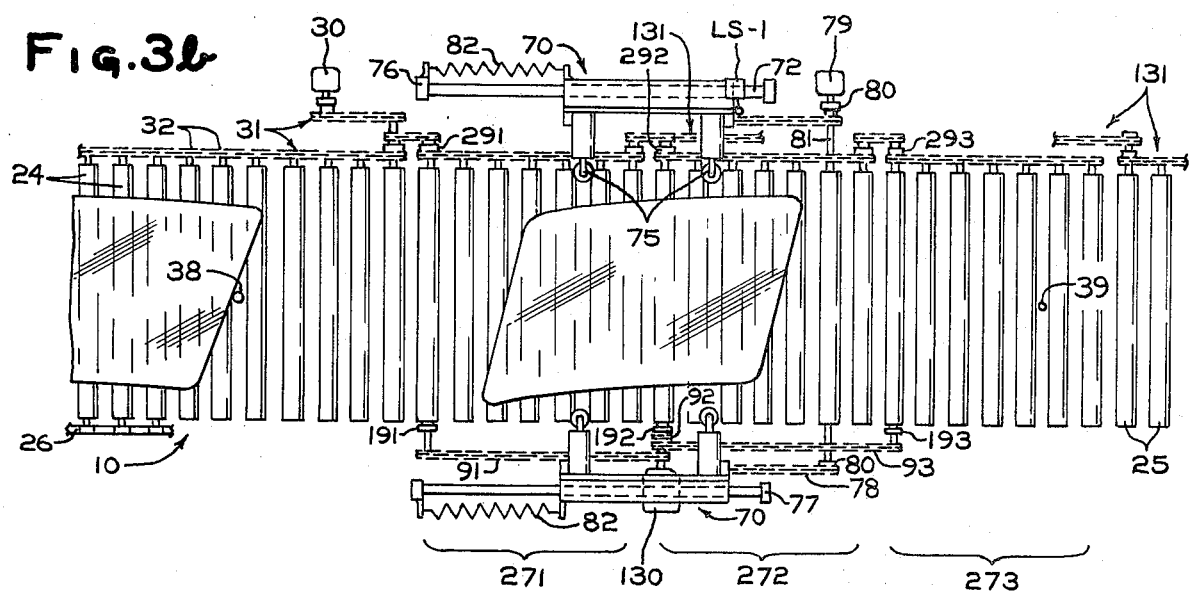
FIG. 3b is a plan view showing the alignment device releasing the glass sheet and the increased spacing between sheets as the speed of a selected subseries is increased.
Figure 3C:
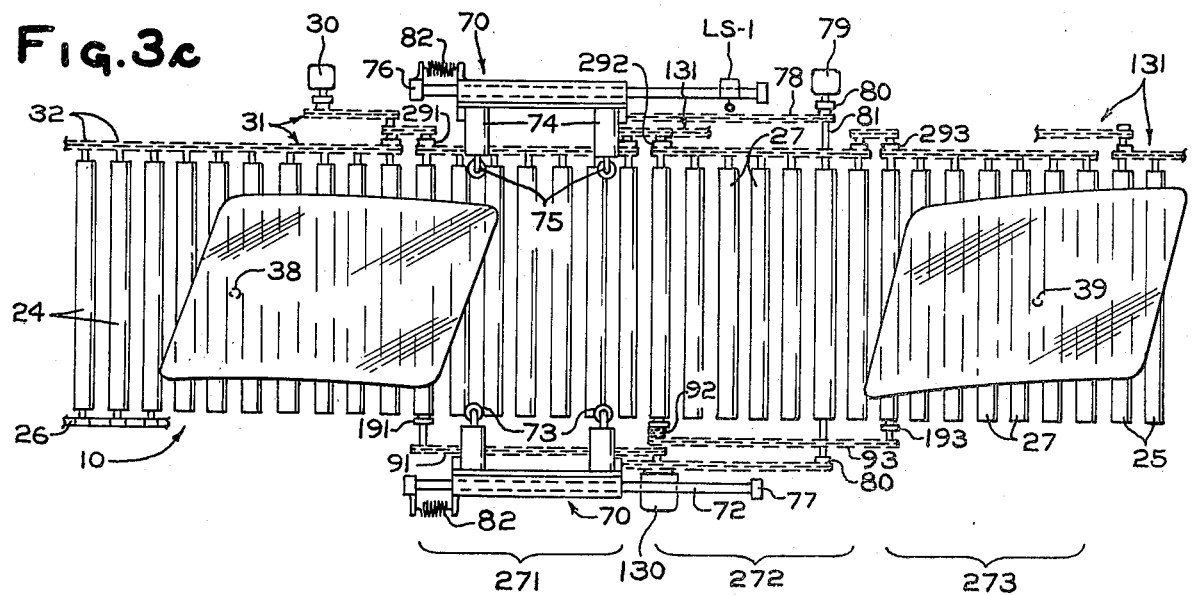
FIG. 3c is a plan view showing the return of the alignment device and the further increased spacing between sheets as the first sheet passes over the last subseries.

When, as depicted in FIG. 3B, limit switch LS-1 is actuated by the forward movement of one of the carriages 70, it actuates three high speed timer circuits, which simultaneously engage clutches 191, 192 and 193, while simultaneously disengaging companion clutches 291, 292 and 293. Thus, a selected series of conveyor rolls 27 whose speed is selectively controlled by the actuation of clutches 191, 192 and 193 rotate at the second speed for a limited time. The high speed timer circuit 40 controlling clutch 191 and companion clutch 291 times out in a short fraction of a second to disengage clutch 191 and reengage clutch 291 at a time when the trailing edge of the glass sheet has passed over subsection 271, thus returning the rolls of subsection 271 to the first conveyor speed.

Shortly after this time, the leading edge of the next glass sheet in the series passes over the glass sensing mechanism 38 and continues to move into the alignment and orienting station at the first conveyor speed while the carriages 70 are pulled upstream to rear abutments 76. After an intermediate time interval, also controlled by the length of the glass sheet passing through the exit end of the furnace 14, the second timer circuit controlling clutch 192 and its companion clutch 292 times out to disengage clutch 191 and reengage companion clutch 291, thus enabling the second subseries 272 of conveyor rolls to resume the first conveyor speed. When the next glass sheet is aligned properly with the carriages 70, the carriage timer circuit 40 actuates the carriage motor clutches 80 to drive the carriages 70 downstream through the alignment and orienting station 16 at normal conveyor speed. At the same time, the pistons 74 are extended predetermined distances to engage the opposite side edges of the moving glass sheet and then are retracted before the carriages reach a position to engage limit switch LS-1.

The third timer circuit controlling clutch 193 and its companion clutch 293 times out when the trailing edge of the preceding glass sheet has passed into the third subseries 273 of conveyor rolls to disengage clutch 193 and reengage companion clutch 293 to have the entire series of conveyor rolls 27 resume the first speed of the conveyor. The cycle is thus repeated over and over again as long as glass sheets are available to be treated.

The simultaneous engagement of high speed clutches 191, 192 and 193 and their sequential inactivation in accordance with a predetermined time cycle based on the time it takes for the trailing edge of each glass sheet to clear each subseries 271, 272 and 273 of conveyor rolls at the high speed enables all the conveyor rolls that are capable of rotating at a high speed to move each glass sheet forward while rotating at the same high speed and then resume the first conveyor speed as quickly as possible, reduces marking of the glass caused by simultaneously engaging different glass sheet portions with rolls rotating at different velocities. The cycle also reduces misalignment of non-rectangular glass sheets relative to the conveyor. At the same time, the need for exceedingly long conveyors to handle glass sheets in a multiple treatment operation is reduced.

The described apparatus includes three subseries of conveyor rolls, each subseries having a conveyor length of 24 inches (60.96 cm). This enables the apparatus to be adapted to handle sheets 24 to 72 inches (60.96 to 182.88 cm) long without altering the conveyor structure, only adjusting the timer circuits. Changing the length and/or number of subseries makes the timer circuit adjustments able to adjust the conveyor to handle different ranges of sheet lengths as desired.

In a typical operation, the first line speed for the conveyor approximates 330 inches per minute (839.2 centimeters per minute) through the furnace 14 and 800 inches per minute (2032 centimeters per minute) for the high speed through the sheet forming station 18 and the cooling station 20 for roll forming and tempering glass sheets having a nominal thickness of approximately 6 mm.

However, it is understood that these speeds are given by way of example only and that the furnace speed is increased to convey thinner glass sheets and the speed may change with a change of heat intensity in the furnace, for example, and the higher speed through the other treatment stations may be changed in response to changing the length of the sheet forming station and/or the cooling station.

The main advantage of the present invention lies in the ease with which the controls for the speeds of rotation for the subseries 271, 272 and 273 can be changed to accommodate the conveyor system for handling sheets having different lengths. Instead of having to shut down the entire line to change the number of rolls in a multiple speed conveyor section whose selected speed is controlled by a clutch, every time a production pattern is changed the present invention makes it possible to adjust rapidly the length of time each subsection of rolls remains at the second or high speed to the minimum time needed to transfer the sheet entirely to the next subsection or from the last subsection to the conveyor section operating at the second or higher speed by adjusting the time delay factor in each high speed timer circuit, a relatively simple procedure that requires virtually no down time.

The form of the invention shown and described in this disclosure represents an illustrative preferred embodiment of the present invention. It is understood that various changes may be made without departing from the gist of the invention as defined in the claimed subject matter that follows.

I claim:

1. Apparatus for moving a succession of discrete glass sheets into proper orientation and alignment relative to a path and maintaining said orientation and alignment while moving said glass sheets at a non-uniform speed along said path during heat treatment thereof comprising a conveyor including a first series of longitudinally spaced conveyor rolls, a second series of longitudinally spaced conveyor rolls spaced from said first series, a selected series of conveyor rolls comprising a plurality of subseries of said selected series bridging the gap between said first series and said second series, means for rotating said first series of rolls at a first speed, means for rotating said second series of rolls at a second speed faster than said first speed, a plurality of clutch means, each coupled to a different subseries of said selected series of said conveyor rolls to rotate said selected series of conveyor rolls at said second speed when engaged with its associated subseries and permitting said associated subseries of said conveyor rolls to rotate at said first speed when disengaged from said associate subseries, timing means for selectively actuating each of said plurality of clutch means in unison when one of said glass sheets is completely over said selected series and for deactivating each of said plurality of clutch means according to a predetermined time cycle, said path comprising a tunnel-type furnace comprising an alignment and orienting station located near the exit of said furnace, said station comprising means for orienting and aligning each glass sheet in succession as it is conveyed through said station in said furnace at said first speed, when orienting and aligning means comprising retractable glass edge engaging means, carriage means supporting said retractable glass edge engaging means for movement relative thereto, means for moving said carriage means downstream at said first speed while moving said glass edge engaging means into engagement with said glass sheet and then retracting said glass edge engaging means before said timing means actuates said clutch means simultaneously, means for returning said carriage means upstream with said glass edge engaging means retracted in time for the next succeeding glass sheet in said series to arrive at said station, and sheet detector means responsive to the presence of each glass sheet in said series at a predetermined position to actuate said timing means, whereby said carriage means moves downstream in alignment with each said glass sheet at said first speed, said plurality of clutch means engage said associated subseries simultaneously when each glass sheet occupies a preselected position where it is completely over said selected series of said conveyor rolls, and each of said clutch means is individually disengaged from its associated subseries when the trailing edge of each glass sheet passes beyond said associated subseries.

2. Apparatus as in claim 1, further including a sheet forming station located along said conveyor beyond said orienting and aligning means for forming each of said discrete glass sheets in succession before said glass sheet cools to below its deformation temperature while the entire length of said glass sheet is conveyed beyond said furnace at said second speed.

3. Apparatus as in claim 2, wherein said sheet forming station comprises,
an upper set of rotating forming rolls,
a lower set of rotating forming rolls,
each forming roll of one set having a longitudinally extending surface, each forming roll of the other set having a longitudinally extending surface and each forming roll of said one set having a shape complementary to that of a corresponding forming roll of said other set, said corresponding forming rolls of said sets being disposed intermediate adjacent of said conveyor rolls in said sheet forming station, and
means for moving at least one of said sets of rotating forming rolls relative to the other set of rotating forming rolls to engage said glass sheet between said sets to form the latter and thence to a retracted position while said sheet is conveyed through said sheet forming station at said second speed.

4. Apparatus as in claim 3, further including a cooling station comprising a continuation of said second series of conveyor rolls, whereby each glass sheet in succession is conveyed at said second speed through said sheet forming station and said cooling station.

5. In a method of conveying a series of sheets along a conveyor at a non-uniform speed comprising rotating a first series of conveyor rolls at a first speed, rotating a second series of conveyor rolls spaced from said first series of rolls at a second speed faster than said first speed,
rotating a selected series of conveyor rolls comprising a plurality of subseries of said selected series disposed in end to end relation to bridge the space between said first series and said second series at a time cycle of a combination of said first speed and said second speed while a series of glass sheets is conveyed over said rotating conveyor rolls,
the improvement comprising orienting and aligning each sheet in said series of sheets by engaging the edge of said sheet with orienting and aligning means moving downstream at said first speed while said sheet travels on rolls rotating at said first speed from an upstream position to a downstream position, rotating all of said selected rolls simultaneously and in unison at said second speed where said glass sheet is completely over said selected series and after said orienting and aligning step has been completed to transfer said sheet downstream of said downstream position, and, when said sheet reaches said downstream position, moving said orienting and aligning means upstream in the direction opposite the direction of sheet movement of said upstream position for orienting and aligning the next sheet in said series of sheets, and reducing the speed of each subseries of said selected series of rolls in turn whenever the trailing edge of said sheet passes beyond said subseries of rolls.

6. The improvement according to claim 5, further including orienting and aligning each sheet in said series immediately before its speed is increased to said second speed.

* * * * *

UNITED STATES PATENT AND TRADEMARK OFFICE
CERTIFICATE OF CORRECTION

PATENT NO. : 3,992,182
DATED : November 16, 1976
INVENTOR(S) : Robert G. Frank

It is certified that error appears in the above-identified patent and that said Letters Patent are hereby corrected as shown below:

Column 4, line 44, "commom" should be --common--.

Column 9, Claim 1, line 31, "when" should be --said--.

Signed and Sealed this

Eighth Day of February 1977

[SEAL]

Attest:

RUTH C. MASON
*Attesting Officer*

C. MARSHALL DANN
*Commissioner of Patents and Trademarks*